United States Patent [19]

Tsujimichi et al.

[11] Patent Number: 5,649,106
[45] Date of Patent: Jul. 15, 1997

[54] PARALLEL COMPUTER WITH RECONSTRUCTION OF PROCESSOR CLUSTERS

[75] Inventors: Shingo Tsujimichi; Michimasa Kondo, both of Kanagawa, Japan

[73] Assignee: Mitsubishi Denki Kabushiki Kaisha, Tokyo, Japan

[21] Appl. No.: 641,947

[22] Filed: May 2, 1996

Related U.S. Application Data

[63] Continuation of Ser. No. 376,283, Jan. 20, 1995, abandoned, which is a continuation of Ser. No. 840,872, Feb. 25, 1992, abandoned.

[30] Foreign Application Priority Data

Mar. 14, 1991 [JP] Japan .................................. 3-049565
Jun. 11, 1991 [JP] Japan .................................. 3-139065

[51] Int. Cl.$^6$ .................. G06F 15/163; G06F 17/00
[52] U.S. Cl. .................. 395/200.08; 395/200.01; 395/200.03; 395/311; 395/505; 395/511; 395/739; 395/851; 395/858; 395/868
[58] Field of Search .................. 395/800, 650, 395/200.08, 200.03, 851, 858, 311, 739, 868, 505, 511, 200.01; 364/DIG. 1

[56] References Cited

U.S. PATENT DOCUMENTS

| | | | |
|---|---|---|---|
| 4,271,468 | 6/1981 | Christensen et al. | 395/859 |
| 4,412,285 | 10/1983 | Neches et al. | 364/200 |
| 4,564,900 | 1/1986 | Smitt | 395/200.07 |
| 4,574,350 | 3/1986 | Starr | 395/725 |
| 4,648,064 | 3/1987 | Morley | 364/921 |
| 4,814,980 | 3/1989 | Peterson et al. | 395/200 |
| 4,825,359 | 4/1989 | Ohkami et al. | 395/800 |
| 4,897,784 | 1/1990 | Nay | 395/325 |
| 4,985,830 | 1/1991 | Atac et al. | 395/200 |
| 5,056,000 | 10/1991 | Chang | 395/325 |
| 5,086,498 | 2/1992 | Tanaka et al. | 395/200.17 |
| 5,113,390 | 5/1992 | Hayashi et al. | 370/352 |
| 5,182,801 | 1/1993 | Asfour | 395/425 |
| 5,193,187 | 3/1993 | Strout, II et al. | 395/734 |
| 5,197,130 | 3/1993 | Chen et al. | 395/325 |
| 5,361,363 | 11/1994 | Wells et al. | 395/800 |
| 5,377,333 | 12/1994 | Nakagoshi et al. | 395/312 |
| 5,408,676 | 4/1995 | Mori | 395/800 |
| 5,535,410 | 7/1996 | Watanabe et al. | 395/800 |
| 5,590,356 | 12/1996 | Gilbert | 395/200.01 |

FOREIGN PATENT DOCUMENTS 6049465 of 1985 Japan.
194033 of 1989 Japan.

OTHER PUBLICATIONS

Parallel Circuit Simulation Machine Cenju Information Processing, vol. 31, No. 5, May, 1990.
Ward et al., *Computation Structures*, Preface, pp. 559–577, 1990.

Primary Examiner—Thomas G. Black
Assistant Examiner—Jean R. Homere
Attorney, Agent, or Firm—Wolf, Greenfield & Sacks, P.C.

[57] ABSTRACT

A parallel computer having a plurality of cluster buses 2 which are connected to the processor (PE) 1 via the selectors 6. The selectors 6 maintain the same condition until the next instruction is received. In this system, the clusters 11 are reconstructed at appropriate timing during the operation of the processor, thus allowing the number of processors PEs in a cluster to be exchanged in response to variation in the process load allocated to each cluster 11. Accordingly, the resources of the computer are used more effectively. The execution environment of each process may be independent. Real time execution of each process can be assured.

14 Claims, 11 Drawing Sheets

PARALLEL COMPUTER WITH RECONSTRUCTION OF PROCESSOR CLUSTERS

This application is a continuation of application Ser. No. 08/376,283 filed on Jan. 20, 1995, now abandoned, which is a continuation of application Ser. No. 07/840,872 filed on Feb. 25, 1992, now abandoned.

BACKGROUND OF THE INVENTION

The invention relates generally to a parallel computer and more particularly to a parallel computer where the number of the processors connected to a cluster bus can be rearranged during the operation of the computer.

FIG. 11 is a block diagram of a conventional parallel computer which is disclosed in the "Parallel circuit simulation machine Cenju", Nakata et al, Information Processing, Vol. 31, No. 5, Total No. 303, May 15, 1990, pp. 593–601. In FIG. 11, the parallel computer "Cenju" has processors (PE1–PR64). Eight processors connected to each cluster bus 2 form a cluster 11. Cluster buses 2 connects each PE in the cluster 11. A multi-connection network 3 connects each cluster through the network processors (NWP) 4. The network processors (NWP) 4 and the network adapters (NADA) 5 support the data transfer between the clusters 11. In this system, the memories use a distributed shared memory system. The memory is located in each PE and each memory has unique address in the system.

FIG. 12 is a conventional block diagram of the cluster 11 in FIG. 11. In the figure, there are eight processing means 9 in a cluster. Each distributed shared memory 8 at each processing means 9 has unique address in the system and operates as a local memory. Cluster bus 2 connects the processors 1 and the distributed shared memories 8 in the cluster 11. The processor 1 which is connected directly to the cluster bus 2 is called as a "owner processor" and the processor 1 which is connected to the cluster bus via the distributed shared memories 8 is called as a "non-owner processor".

The operation of the conventional parallel processor will be described hereinafter. In the conventional parallel processor system of FIG. 11, the data transfer between the processors 1 is executed via the distributed shared memories 8. A particular processor 1 can directly access to the distributed shared memories 8 of the other processors via cluster bus 2, if the other distributed shared memories 8 are located in the same cluster. If the desired distributed shared memories 8 are located in an other cluster, the processor 1 can access the other distributed shared memories 8 in the other clusters, via cluster bus 2, network processors (NWP) 4, network adaptor (NADA) 5 and a multi-connection network 3. Both above transfers requires the same hardware setup and the same application program, supported by the basic software, but the actual rate of accessing data access is very different between them.

The operation of the system of FIG. 12 will be described hereinafter. During the operation of the conventional parallel processing computer 9, shown in FIG. 12, each processor 1 is able to access directly and at a high speed the data stored in its own distributed shared memory 8. If the processor 1 desires to access data stored in other distributed shared memories 8, it is necessary to access the distributed shared memories 8 via the cluster bus 2. Each processor 1 has two port memories; one for direct access to its own distributed shared memory 8 and the other memory, connected to the cluster bus 2, for accessing other distributed shared memories 8 via the cluster bus 2.

As describe above, the processor 1 has two port memories. The processor 1 is able to access other distributed shared memories 8 without disturbing its access to its own memory. But if a plurality of accesses are carried out at the same time between the non-owner processors 1. The order of accession on the cluster must be meditated since the processors 1 compete for access with each other. Accordingly it may be necessary for a processor 1 to wait for an opportunity to access other distributed shared memories. Since computing and data transfer is carried out by time sharing in one processor 1 of the system, an increase in the numbers of data transfers will influence the computing time and degrades the performance of the system.

In the conventional parallel computer, the parallel processes needed to perform a data transfer in a closed cluster are different from parallel processes between clusters. Therefore, if the load from the application program, which allocates the clusters changes, the program can not adapt flexibly to the allocation of clusters. Accordingly, the processors 1 in a cluster 11 have to wait for a chance to make connection without being connected, or have to use other processor 1 in other cluster 11 by degrading the data transfer performance.

As the cluster numbers or the process numbers between the clusters 11 increase, so does the access numbers increase and the competition of the clusters occurs in the multi-connection network 3. Sometimes the processors 1 are able to smoothly access the other distributed shared memories 8 via the multi-connection network 3, but at the other time, the processors 1 are not able to smoothly access other distributed shared memories 8 via the multi-connection network 3 and must wait until the multi-connection network 3 become available. Therefore, the processing period may be different for the same process. In a real time processing system, if the processing period is different for the same process, different results may be obtained for the same process. Accordingly it is desirable that the processing system is able to complete the process in the same period if the process is the same.

As described above, in the conventional parallel computer shown in FIG. 11, there are many problems such that the processor 1 are not used effectively. The real time processing can not be assured since the clusters do not operate independently. Data transfer efficiency is degraded as a result.

In the conventional parallel computer shown in FIG. 12, non-owner processors 1 must wait to access the distributed shared memories 8 if a plurality of accesses are executed at a same time since the competition occurs between the cluster buses 2. If the waiting control is carried out by the hardware controller or software controller, each processor 1 has excessive overhead. Since data transfers are carried out when data is generated or when data is needed, data transfers are sometimes concentrated. It causes problems that the processors 1 are not used effectively or the data transfer efficiency of the data buses is degraded.

It is a primary object of the present invention to provide a parallel computer which is able to reconstruct the clusters during operation of the computer. As a result of changing the processors 1 numbers in the cluster in response to the load variation of the application programs which are allocated to each cluster, the resources of processor 1 are able to be used effectively. The real-time for processing and reproductivity can be assured because od the independence between the clusters.

It is further object of the present invention to increase the data transfer efficiency of the cluster buses by decreasing the transfer overhead for the processor 1 by using a separated data transfer processor which controls the transfer of data between processors 1 and distributed shared memories 8 via cluster buses 2, by increasing the degree of the freedom for selecting the data transfer timing which is independent of the time at which the data is generated and when data is needed.

It is further object of the present invention to increase the data transfer efficiency of the cluster buses by decreasing the transfer overhead for waiting the synchronous operation in the processors 1.

It is further object of the present invention to provide compilers which produce the transfer programs needed for the new architecture. Since the compiler extracts the data transfer program automatically from the arithmetic program, the programmer can write programs without any knowledge of the architecture of the system.

It is still further object of the present invention to increase the data transfer efficiency of the cluster buses 2 by reducing the overhead during a normal data transfer. An interruption signal is generated only when there is no data in FIFO 33 for the transfer processor 31 to access. As a result, the transfer processor starts the transfer operation assuming that data is ready to be transferred and waits for the data only when the data transfer has failed.

SUMMARY OF THE INVENTION

A parallel computer of the present invention comprises (a) a plurality of processor means for processing information, (b) a plurality of data transfer means for connecting to each processor means, and (c) a plurality of selector means which are responsive to each processor for selecting, one of a plurality of data transfer means, connected to each processor means, and for connecting the selected data transfer means to the processor means.

DETAILED DESCRIPTION OF THE PREFERRED EMBODIMENTS

First Embodiment

Figure 1:
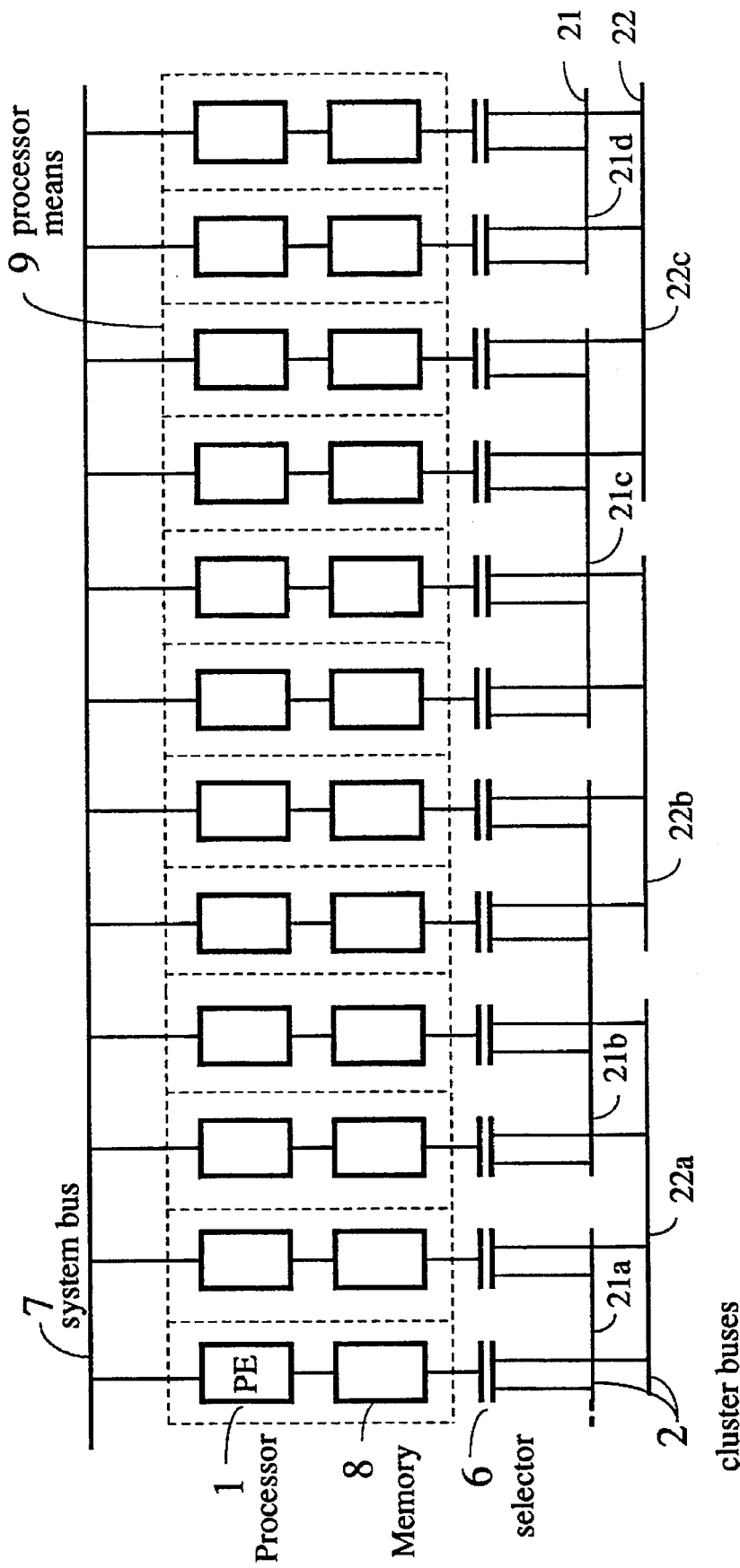
FIG. 1 is a block diagram of the parallel computer showing the first embodiment of the present invention.

FIG. 1 is a block diagram of the parallel computer showing the first embodiment of the present invention. In FIG. 1, processors 1 process the procedures stored in memories 8. Processor means 9 include processors 1 and memories 8. Cluster buses 2 transfer data in a processor 1 to the other processors 1 in the same cluster or to other processor 1 in other clusters. A first cluster bus 21 is constructed from a plurality of sub-cluster buses of 21a, 21b, 21c and 21d. A second cluster bus 22 is constructed from a plurality of sub-cluster buses of 22a, 22b and 22c. The buses 21 and 22 are connected to the processor 1 through a selector 6 which selects either the first bus 21 or the second bus 22 to the processor 1. The sub-cluster buses are separated as shown in the FIG. 1. Each sub-cluster bus is connected to four processors 1. Each processor 1 is connected to two cluster buses through the selector 6. A system bus 7 transfers data between the clusters connecting the whole system.

The operation of the present invention is explained hereinafter.

All selectors 6 in the system operate at the same time. That is, the selectors 6 do not operate separately. The selectors do not operate for each transfer of data. The operation timing for the selectors 6 is called system reconstruction timing.

The reconstruction timing of the system is decided from the start timing and finish timing for a plurality of the real time processes which are executed at the same time. Each processor 1 is able to be connected to two buses. The change of the connections to one of the buses is executed only at the above system reconstruction timing. At any other timing, each processor 1 is fixed to either bus of the cluster bus 21 or the cluster bus 22. As a result, the clusters in the system is fixed and each processor 1 in a cluster is connected to only one cluster bus.

Each reconstructed cluster bus operates independently. The cluster bus is not influenced by the other process contents or process conditions in other clusters. In FIG. 1, each sub-cluster bus is able to be connected to the four processors 1. Each processor 1 can be connected to two sub-cluster buses. The cluster construction of the system is changed by altering the connections between the cluster buses 2 and processors 1.

Figure 2:
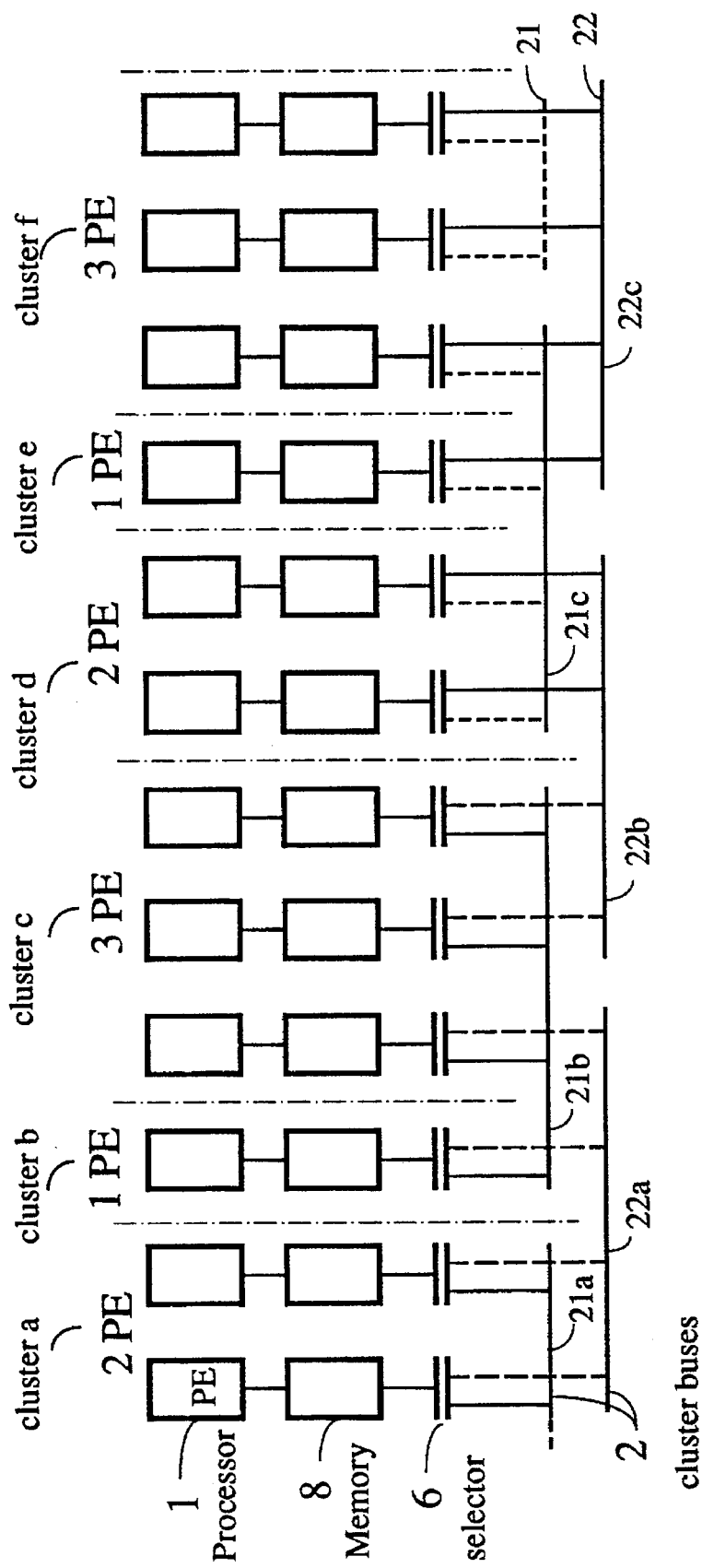
FIG. 2 is a second cluster construction showing the first embodiment of the present invention.
Figure 3:
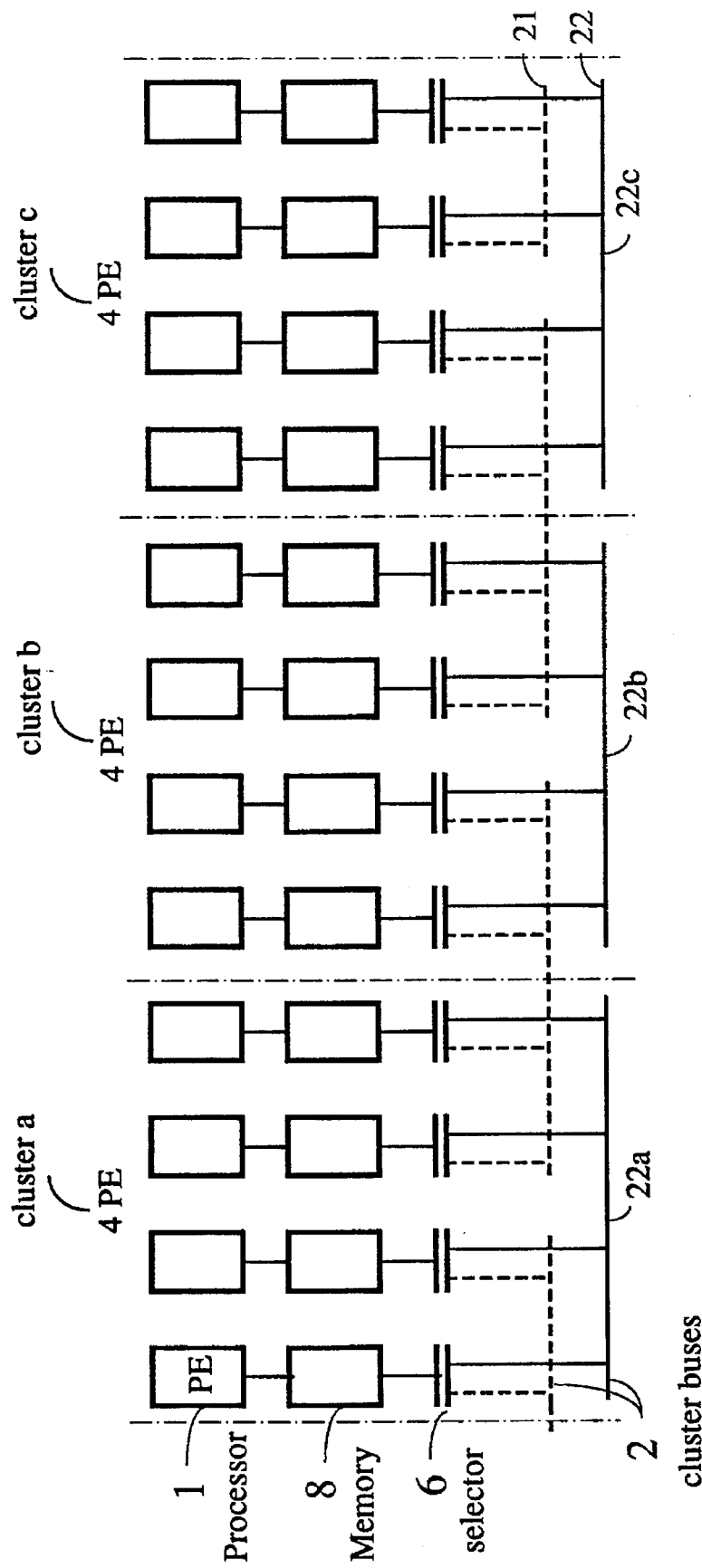
FIG. 3 is a third cluster construction showing the first embodiment of the present invention.

FIG. 2 and FIG. 3 shows examples in which the cluster constructions are changed by altering the connection between the cluster buses and processors 1. FIG. 2 shows an example of a cluster construction. Cluster a is constructed from two processor means using sub-cluster bus 21a, cluster b is constructed from a processor means using sub-cluster bus 21b, cluster c is constructed from three processor means using sub-cluster bus 21b, cluster d is constructed from two processor means using sub-cluster bus 22b, cluster e is constructed from a processor means using sub-cluster bus 22c, and cluster f is constructed from three processor means using sub-cluster bus 22c. As shown in FIG. 2, the processor 1 numbers in the cluster may vary from one to four by using two cluster buses.

It is not always necessary to use all cluster buses 2 in the cluster. The clusters may be constructed so that only one cluster bus 22 is used without using cluster bus 21. FIG. 3 shows an example of such a cluster construction. Cluster a is constructed from four processor means using sub-cluster bus 22a, cluster b is constructed from four processor means using sub-cluster bus 22b, and cluster c is constructed from four processor means using sub-cluster bus 22c. As shown in FIG. 3, at most four processors 1 may be connected to each cluster. In this case, cluster bus 21 is wasted because it is not used. Although it is not shown in FIG. 2 and FIG. 3, data may be transferred between the clusters via the system bus 7 if real time process for the request is small.

As shown in FIG. 2 and FIG. 3, each cluster a, b, c, d, e and f is constructed so that the given process may be executed in its own cluster, independent of the other clusters. Selector 6 selects the desired sub-cluster buses.

As described above, if a cluster is reconstructed before the process is executed, the process may be executed within its own cluster without accessing the other clusters. For example, if each process a, b, c, d, e and f is accessed in parallel and needs two, one, three, two, one, three processors respectively, the selectors 6 are changed beforehand to construct the system as shown in FIG. 2.

As a result of making the construction as shown in FIG. 2 before executing the process a, b, c, d, e and f, the process operation environment may be defined steadily and the operation time and operation result can be obtained consistently. In prior parallel processors, there are many reasons why processor 1 are not used effectively. Real time operation within a cluster is difficult to obtain since independence of operation can not be assured. The data transfer efficiency is degraded in the system. In the embodiment shown in FIG. 2, these problems are eliminated.

Second Embodiment

Figure 4:
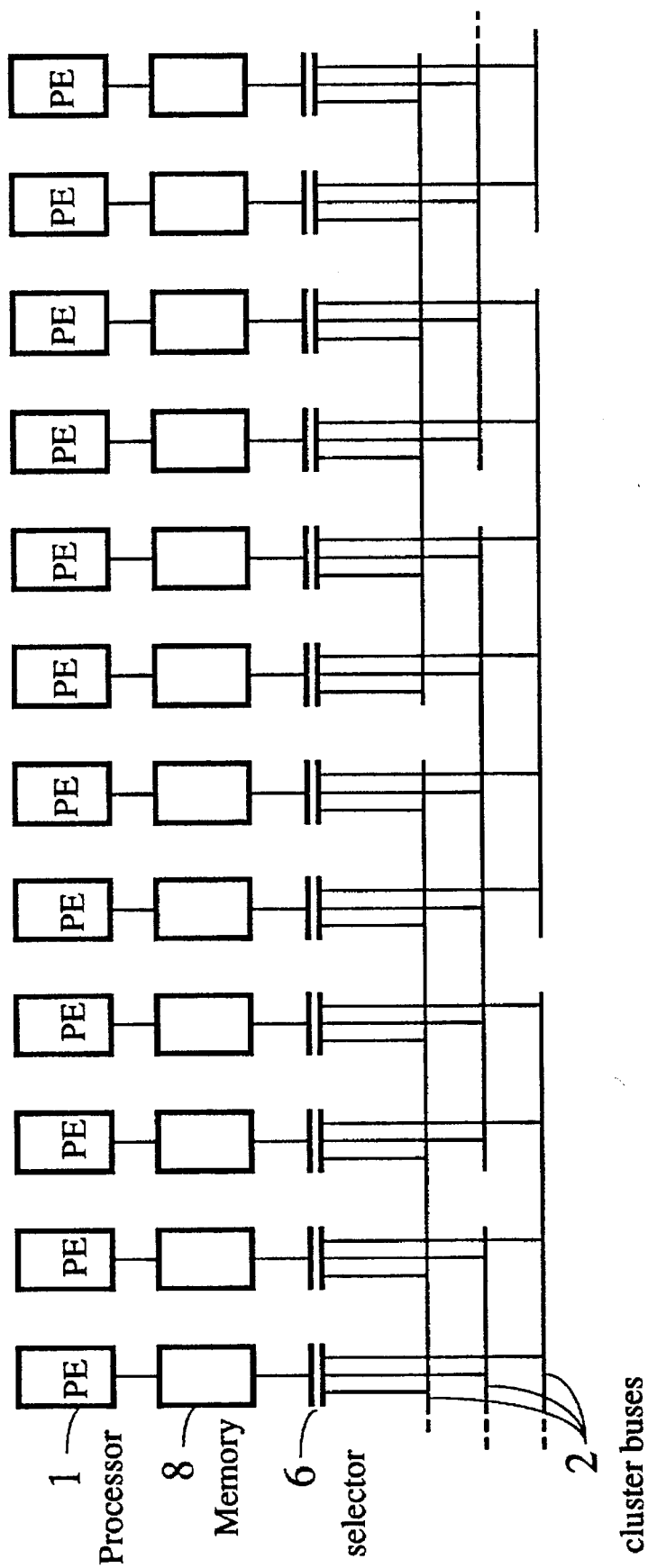
FIG. 4 is a fourth cluster construction showing the second embodiment of the present invention.

FIG. 4 is a fourth cluster construction showing the second embodiment of the present invention. In the FIGS. 1–3, two cluster buses are shown, but in FIG. 4 three cluster buses are shown. Three, four or more cluster buses may be used. As the number of cluster buses increases, the number of the cluster in the system increases. The arrangement of processors 1 in a cluster may be more freely selected with three cluster buses and the possible cluster construction in the whole system can be more freely selected.

Third Embodiment

In FIG. 3, the sub-cluster buses are constructed by separating the cluster buses for every four processors. The number of the processors for a sub-cluster buses may be two, three, five, six or more. The number of the processors can be different for a sub-cluster buses such as two, three, five, six or more. The number of sub-cluster buses connected to a processor can be vary between clusters. The number of clusters in the system and the number of processor 1 in a cluster may be more freely selected and the possible cluster construction in the whole system can be more freely selected.

Fourth Embodiment

Figure 5:
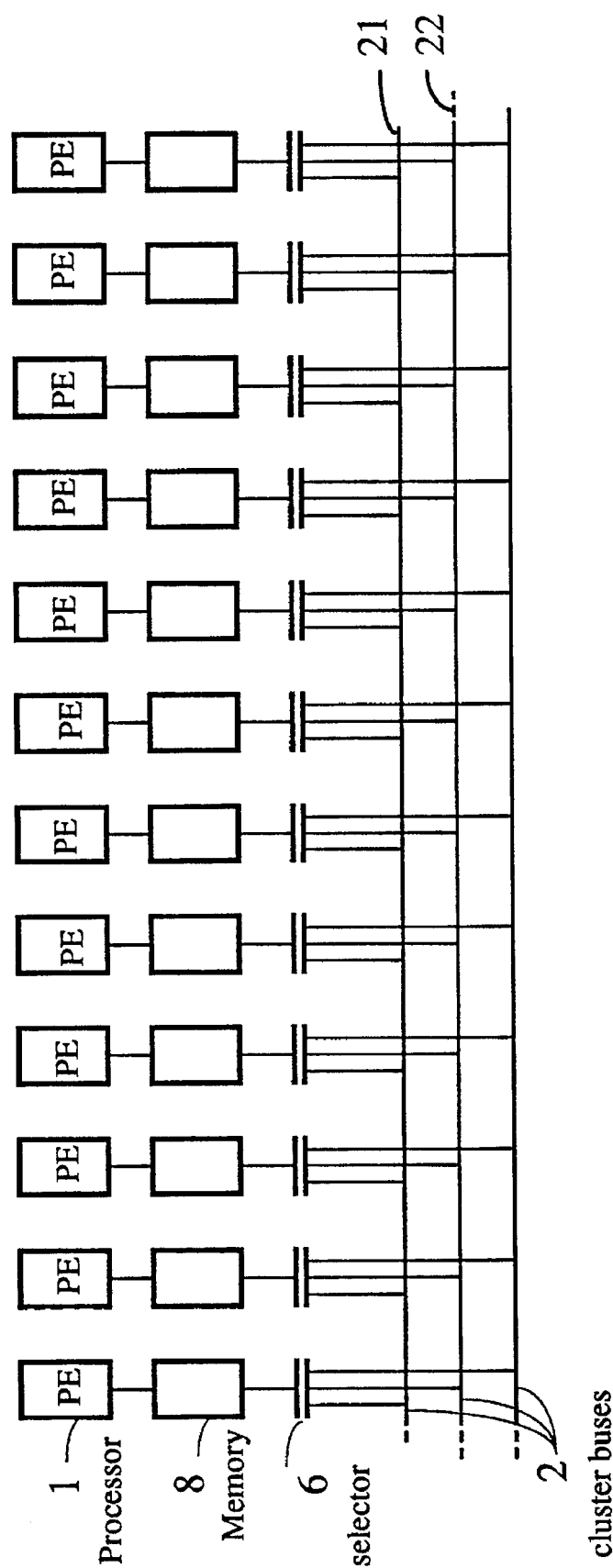
FIG. 5 is a fifth cluster construction showing the fourth embodiment of the present invention.

In the previous embodiment, the sub-cluster buses are separated into several portions, but the sub-cluster buses do not necessarily have to be separated in pieces. In FIG. 5, the cluster buses 21 and 22 are not separated in pieces but instead are continuous. The system may be have two, three or more cluster buses which are not separated. The number of clusters in the system and the number of processor 1 in a cluster may be more freely selected and the possible cluster construction in the whole system can be more freely selected.

Although not shown in FIG. 5, the system may be constructed with cluster bus 21 separated into pieces and with cluster bus 22 in one continuous piece.

Fifth Embodiment

Figure 6:
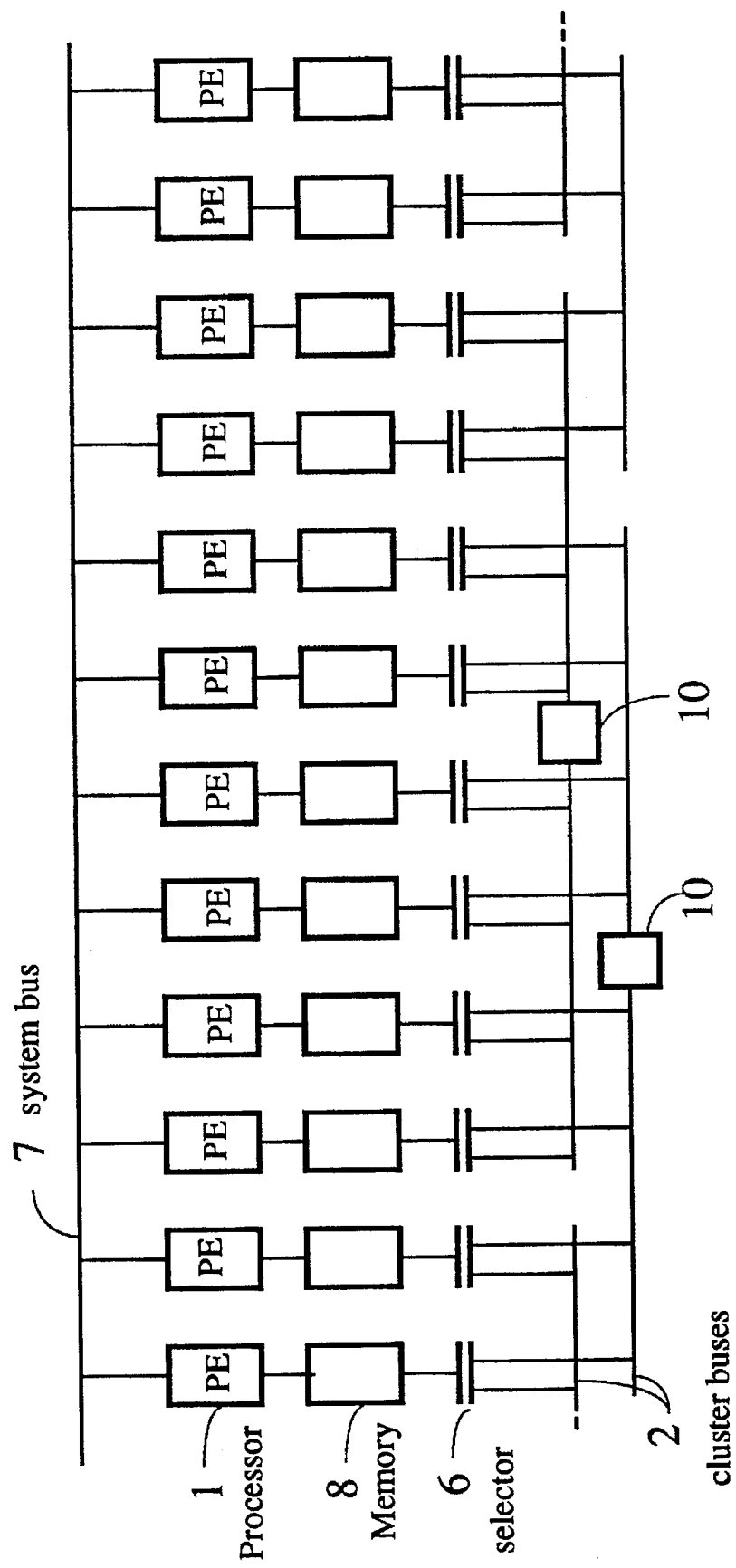
FIG. 6 is a sixth cluster construction showing the fifth embodiment of the present invention.

In the first embodiment, the sub-cluster buses are separated into several portions. These sub-cluster buses may be connected with bus connectors 10, shown in FIG. 6. The bus connectors 10 may connect not only adjacent sub-cluster buses, but also sub-cluster buses at any distance. Again, the cluster construction may be freely selected for the whole system. The bus connectors 10 may connect not only sub-cluster buses in its own cluster bus, but also sub-cluster buses in the other cluster buses.

Sixth Embodiment

In the above embodiment, the processors processor 1 are connected together by cluster buses, but any kinds of network may be used for connecting the processors 1 together.

Seventh Embodiment

In the above embodiments, the memory is a distributed shared memory which is characterized strongly by the local memory, but the memory may be a completely shared memory or a completely local memory.

Eighth Embodiment

In the above embodiments, the system reconstruction is executed at the same time for the whole system, but the system reconstruction may be executed in parts for the whole system. In order to use separated unused processor 1, the system may be reconstructed at an appropriate interval.

In the above embodiments, the parallel computer comprises a plurality of data transfer means (cluster buses) provided for each processor in order to construct the cluster between the processor 1, a plurality of selector means for selecting one of the data transfer means for each processor during the operation of the computer, and control means for reconstructing the selection and fixing of the data transfer means in accordance with requests from the application program at an appropriate timing during the operation of the computer.

Another parallel processing computer, described in the laid-open patent publication No. 61-148564/86, has a plurality of processors which are arranged and connected in two dimensions. The parallel processing computer has bus connection means which connect directly the processors arranged in the different row and column. In the above prior art, the parallel processing computer connects directly processors arranged in predetermined rows and columns. The parallel processing computer is not able to change the connections between the processors arranged in the rows and columns. This prior art is believed to be different from the present invention.

Ninth Embodiment

Figure 7:
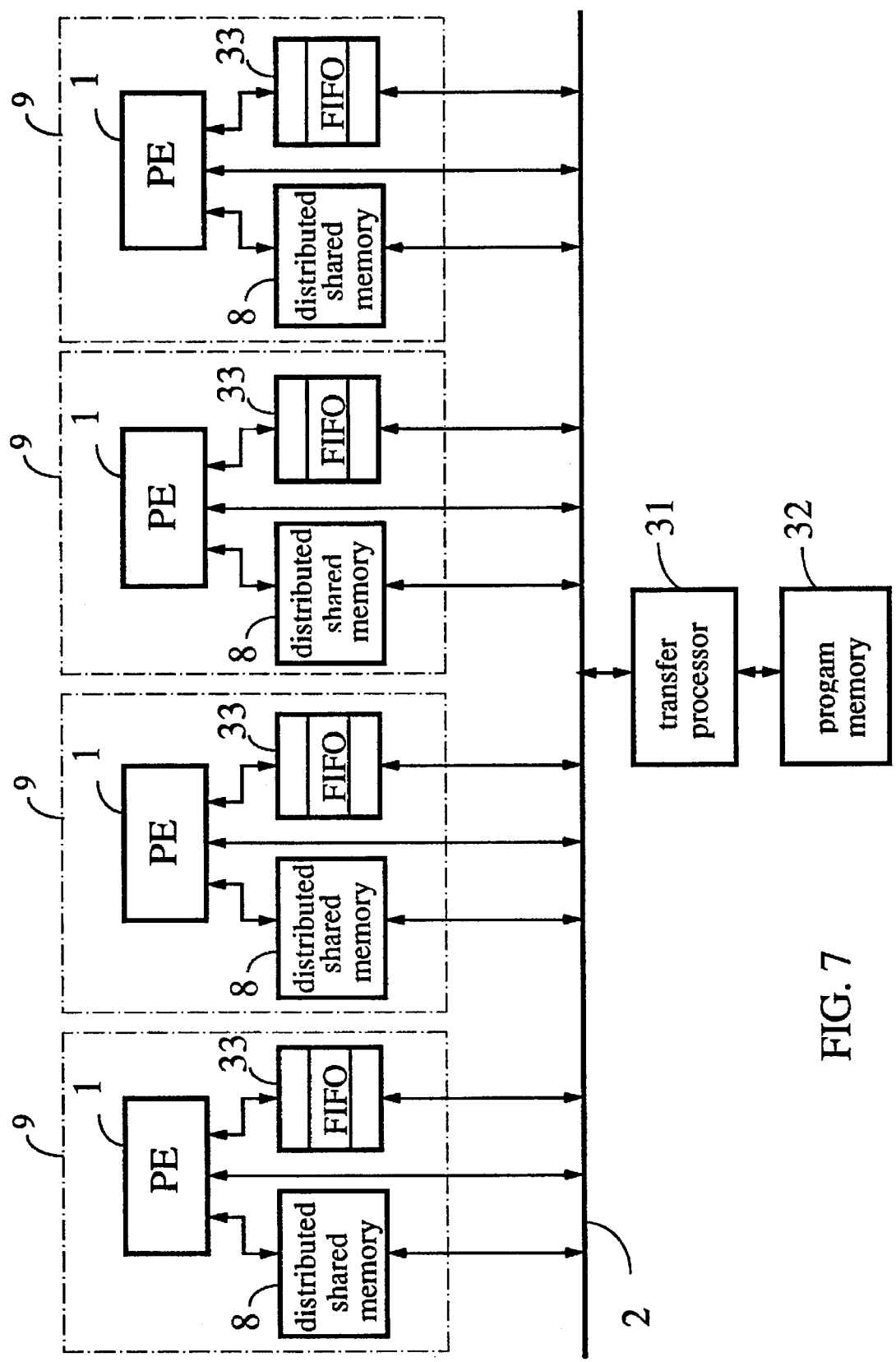
FIG. 7 is a block diagram of a cluster showing the ninth embodiment of the present invention.

FIG. 7 is a block diagram of the parallel computer of the ninth embodiment of the present invention. In FIG. 7, processors 1 process the procedures stored in the distributed shared memories 8 which are characterized strongly by the local memory. Cluster buses 2 transfer the data in the cluster from processor 1 in the same cluster. A transfer processor 31 controls the data transfer between the processors 1. A program memory 32 stores transfer programs which execute the data transfer. FIFO registers 33 stores the data which are to be transferred to the other processors 1.

The operation of FIG. 7 is explained hereinafter.

When the four processors 1 execute blocks of procedures in parallel operation, it is often necessary to transfer data between the processors 1 and also between their distributed shared memories 8. The processors 1 output data to the FIFO register 33. Further transfer processes to the other processors 1 or to the distributed shared memories 8 are executed by the transfer processor 31 as follows.

In the present architecture, a static scheduling is adopted in which sharing method for processing and procedures between the processors 1 are not changed during execution of a certain amount of the processing. That is, the interruption method and synchronous timing of the processors 1 are provided at the time of making programs. The timing for the data transfer is generally known beforehand and the output data order from each processor is known beforehand. It is also completely known beforehand where the data is to be transferred.

Therefore, the data transfer program can be written beforehand. The transfer program is written with the arithmetic program and loaded into the program memory 32 in the transfer processor 31. The transfer processor 31 reads the data from the FIFO 33 in accordance with the program and transfers it to the distributed shared memories of the assigned processor.

The order in which data is to be read from the FIFO 33 is the same as the order in which the processor outputs data to the FIFO 33. The order in which FIFOs 33 are accessed is decided at the time when the program is made. The order can not be changed during execution of the program.

As described above, it is necessary that the data be stored in the FIFO 33 before the data can be transferred. The transfer timing procedure which executes the synchronous control in a high speed is explained using FIG. 7 and FIG. 8.

Processor 1 calculates in accordance with the arithmetic program and stores the calculated results in FIFO 33. The transfer processor 31 accesses FIFO 33 according to its own program. Sometimes data will not yet be stored in FIFO 33 when the transfer processor 31 accesses the FIFO 33. When the data is not stored in the FIFO 33, an interruption signal is outputted from the FIFO 33 to the transfer processor 31. A detailed explanation regarding the interruption operation is explained hereinafter using FIG. 8.

Figure 8:
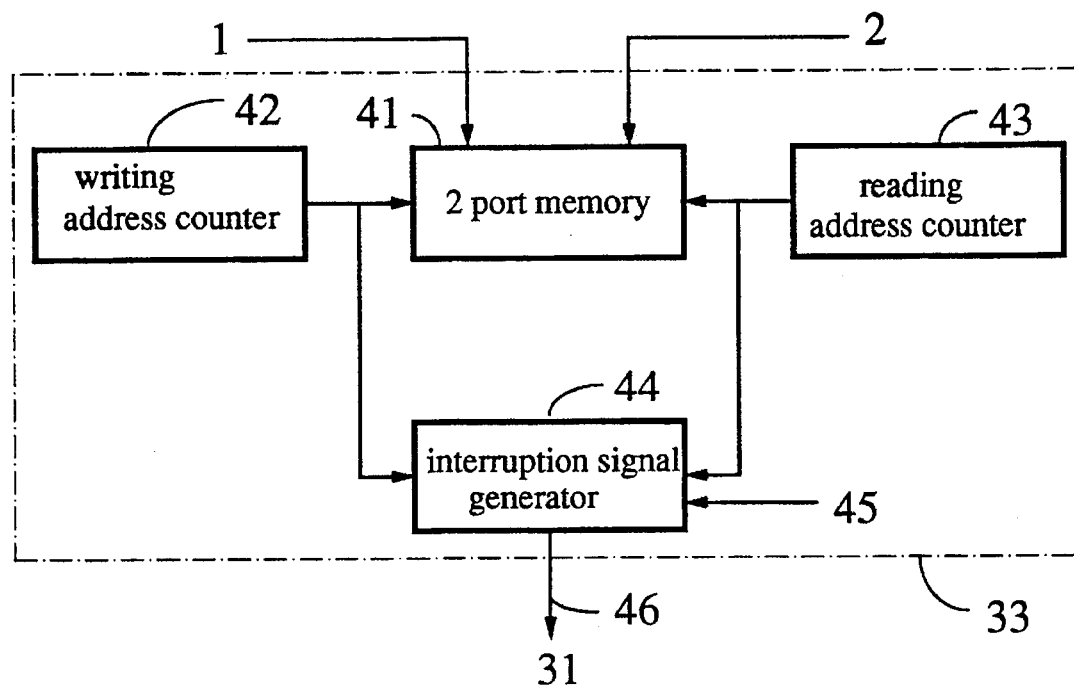
FIG. 8 is a block diagram of a FIFO register of the ninth embodiment of the present invention.

FIG. 8 is a block diagram of the FIFO register 33 which has the function of generating an interruption signal when data is not present in accordance with the ninth embodiment of the present invention. In FIG. 8, the data is stored in the two port memory 41 in the FIFO register 33. A writing address counter 42 counts the writing address of the two port memory 41. A reading address counter 43 counts the reading address of the two port memory 41. A interruption signal generation circuit 44 generates an interruption signal when the transfer processor 31 accesses the FIFO 33 before the data is stored in the two port memory 41. The interruption signal generation circuit 44 includes a comparator not shown in FIG. 8.

When the transfer processor 31 accesses the FIFO 33, the transfer processor 31 sends a reading strobe signal 45 to the FIFO 33. When the reading strobe signal 45 is inputted from the transfer processor 31, the comparator compares the contents of the writing address counter 42 with the contents of the reading address counter 43. If the content of the reading address counter 43 is larger than the content of the writing address counter 42, the comparator determines that the data has not been prepared yet, and sends the interruption signal to the transfer processor 31. When the transfer processor 31 receives the interruption signal from the FIFO 33, the transfer processor 31 determines that the data transfer has failed, and executes the reading procedure again according to the interruption processing program. When the interruption signal is not received from the FIFO 33, the transfer processor 31 determines that the data transfer has been executed properly, and executes the next procedure according to the data transfer program.

In this system, the transfer processor 31 assumes that the data is stored in the FIFO 33. Only if the data transfer has failed, does the transfer processor 31 retry the data transfer by the interruption procedure. This method reduces the overhead. Since the data transfer is controlled by the transfer processor 31, the data transfer is not influenced by the generation of data or the request for data from the processor 1. If the system has sufficient capacity for data transfer, then data transfers occur at substantially the same rate at which data is generated. The timing for data transfers may be freely selected so that the cluster buses are used effectively.

Programmers could produce the above mentioned data transfer program, but it would be substantial amount of work. Instead, the transfer program is produced by the preprocessor 52 in this system. The preprocessor 52 is used in combination with the parallel language compiler 55.

Figure 9:
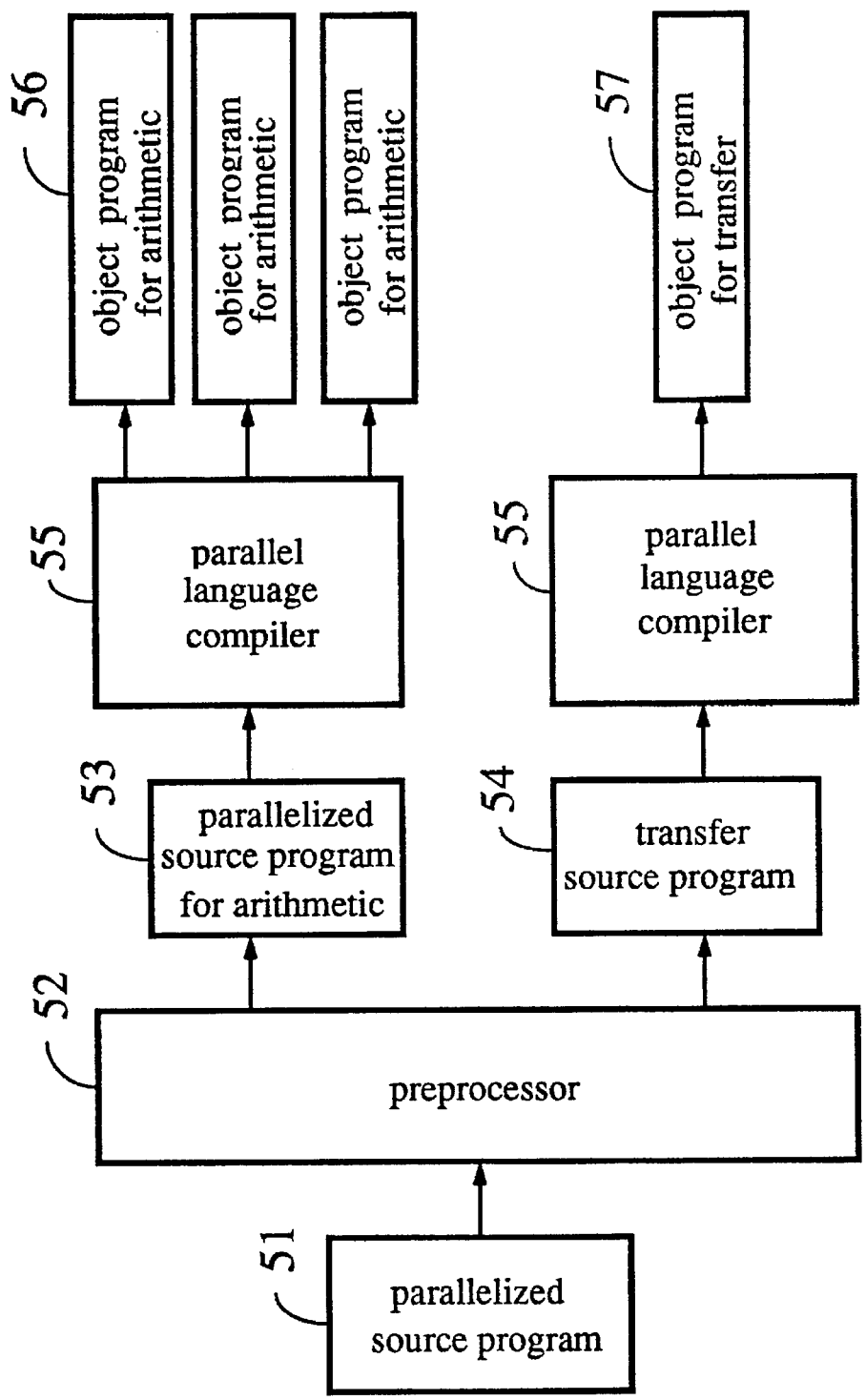
FIG. 9 is a compiler system diagram for the ninth embodiment of the present invention.
Figure 11:
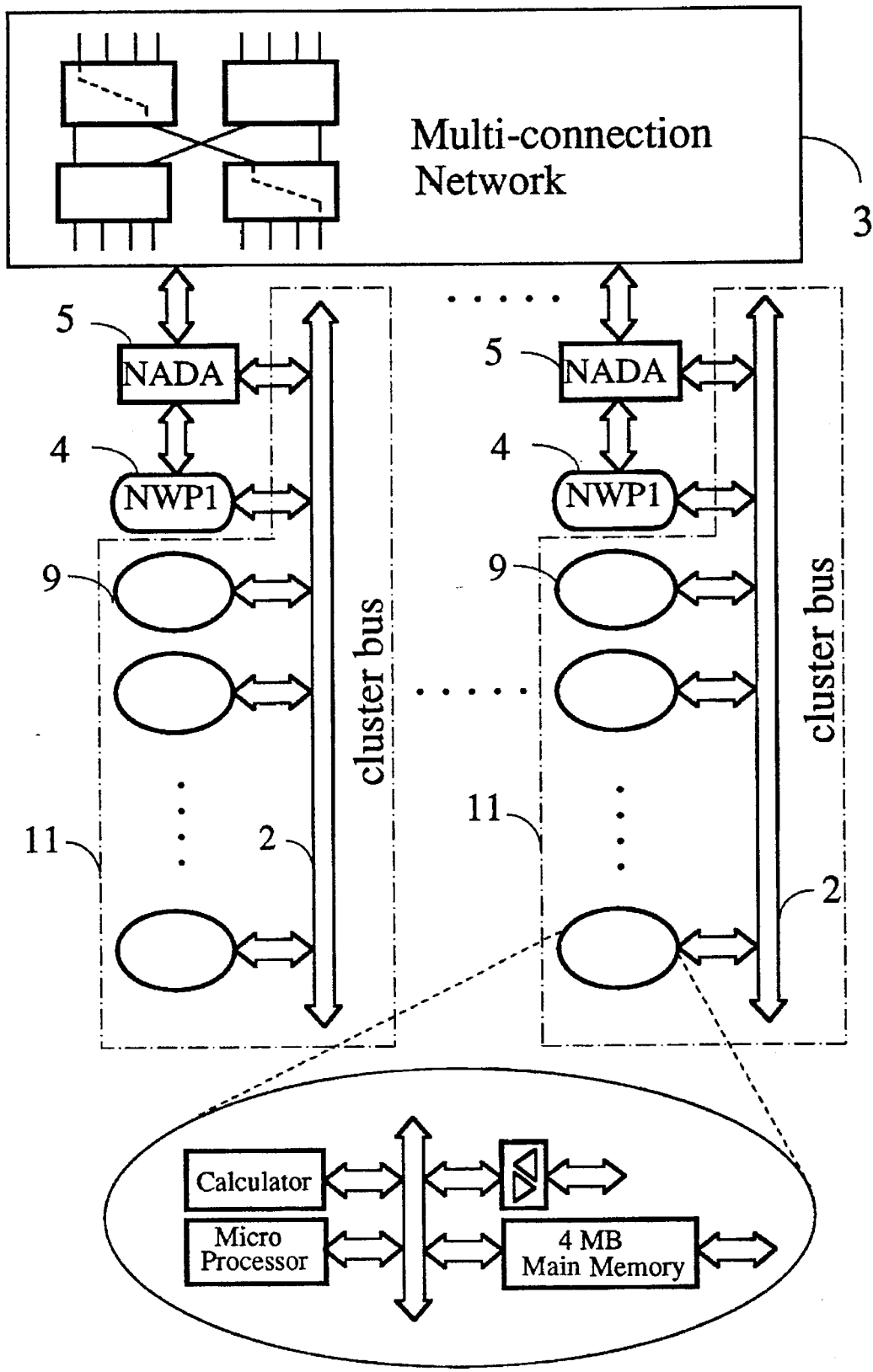
FIG. 11 is a block diagram of the prior art parallel computer.
Figure 12:
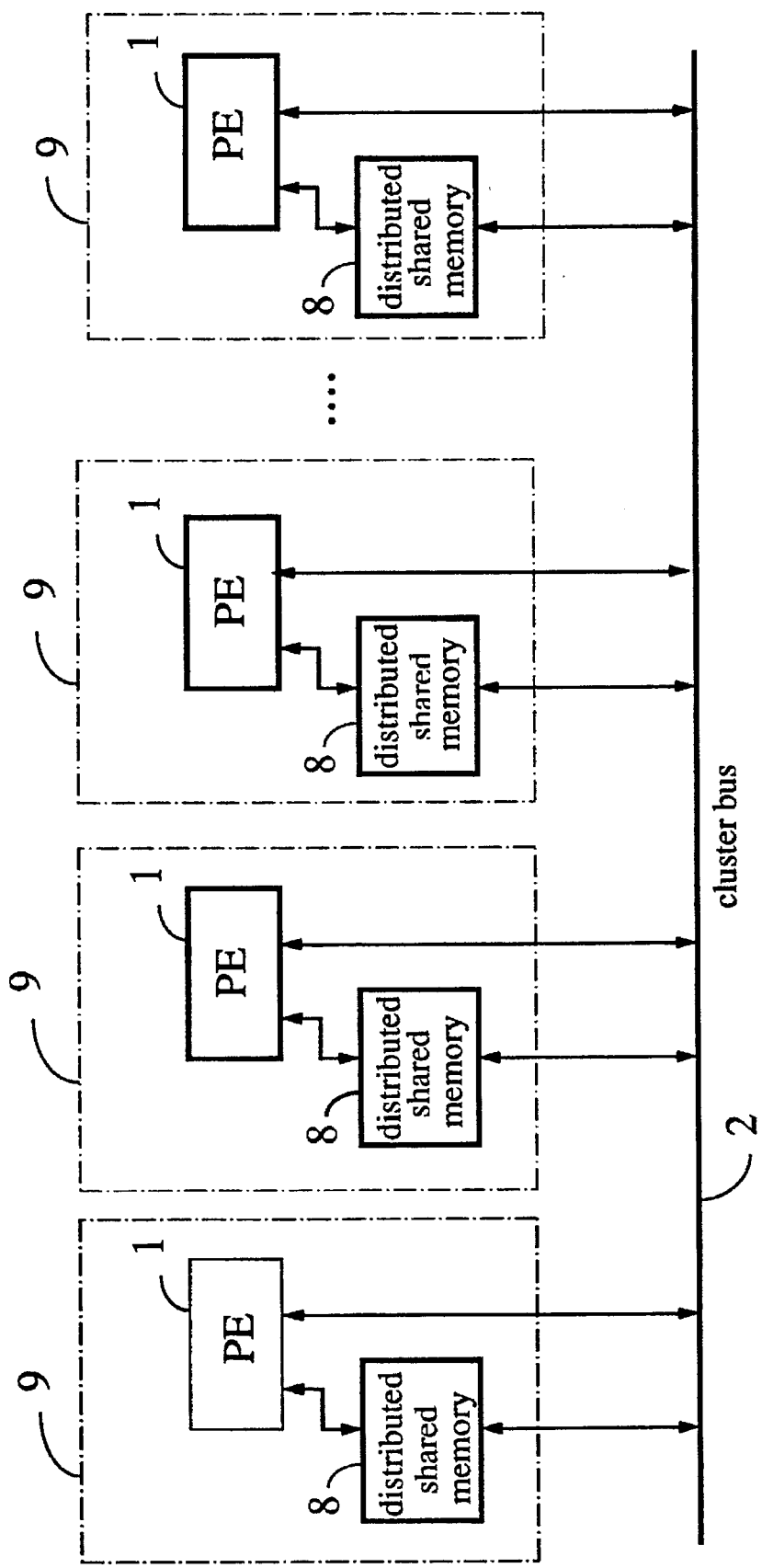
FIG. 12 is a cluster construction for the prior art parallel computer.

FIG. 9 is a compiler system diagram of the ninth embodiment of the present invention. In FIG. 9, a parallelized source program 51 is written in parallel language. A preprocessor 52 separates the parallelized source program into parallelized source program arithmetic and transfer source program. A parallelized source program for arithmetic 53 is separated from the parallelized source program 51 by the preprocessor 52. A transfer source program 54 is also separated from the parallelized source program 51 by the preprocessor 52. The parallel language compilers 55 are conventional compilers. An object program for arithmetic 56 is outputted from one of the parallel language compilers 55. An object program for transfer 57 is outputted from the parallel language compiler 55.

The programmers write the parallelized source program 51 using the conventional parallel language. The arithmetic part and transfer part of the parallelized source program 51 are separated into the parallelized source program for arithmetic 53 and the transfer source program 54 by the preprocessor 52. The parallelized source program for arithmetic 53 and the transfer source program 54 are changed to the object program for arithmetic 56 and the object program for transfer 57 by the parallel language compilers 55 respectively.

Figure 10:
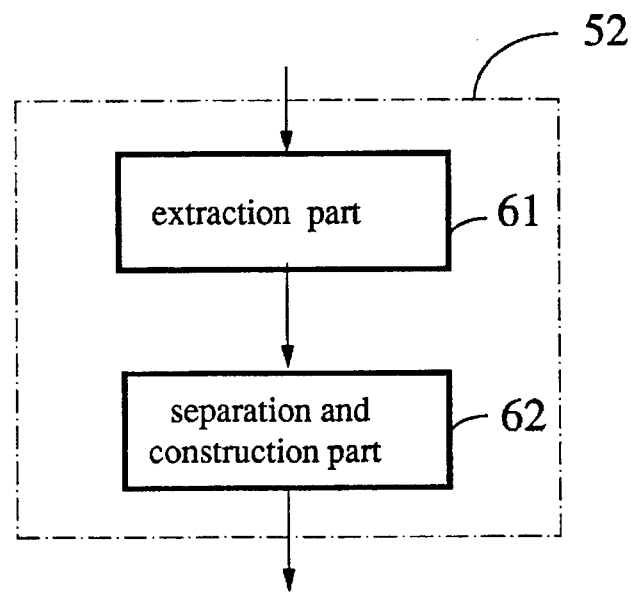
FIG. 10 is a block diagram of the preprocessor for the ninth embodiment of the present invention.

FIG. 10 is a block diagram of the preprocessor 52 for the ninth embodiment of the present invention. An extracting part 61 extracts the portions related to the data transfer between the processors 1. A separation and reconstruction part 62 separates and reconstructs the arithmetic program and the transfer program.

In the preprocessor 52, the extracting portion 61 checks all reading and writing operation of the memory, detecting the portions which are accessing the distributed shared memories 8. The separation and reconstruction part 62 separates the portions associated with data transfer between the processors 1 from the portion detected by the extracting part 61 and reconstructs the data transfer program using FIFO 33. The remaining arithmetic program reconstructs the system by reading the access instructions aimed to other distributed shared memories 8, from its own distributed shared memory 8, or by writing the access instruction into its own FIFO 33. At the same time, the preprocessor 52 adds the necessary synchronous control instruction to the respective transfer and arithmetic program.

Tenth Embodiment

In the above ninth embodiment, the clusters having four processors 1 are described, but the clusters may include any number of processors 1 more than two.

Eleventh Embodiment

In the above ninth embodiment, the processors 1 are connected together by the cluster buses, but any kinds of network may be used for connecting the processors 1 together.

Twelfth Embodiment

In the above ninth embodiment, the memories characterized strongly by the local memories, are distributed shared memories, but can be complete local memories.

Thirteenth Embodiment

In the above ninth embodiment, FIFO 33 is used as the buffer, but other types of data buffer may be used instead of the FIFO 33. For example, output data may be stored in the distributed shared memory 8. In that case, the processor 1 would access the data using a predetermined addresses.

Fourteenth Embodiment

In the above ninth embodiment, the preprocessor 52 is combined with the parallel language compiler 55, but the automatic extraction, separation and reconstruction function may be built in to the parallel language compiler 55 or automatic parallel compiler.

What is claimed is:

1. A parallel computer which allows for selective construction of clusters during operation of the parallel computer, comprising:

(a) a plurality of processors, each running an operating program and each processor capable of accessing a respective memory, coupled to the processor, at an arbitrary timing according to the operating program, for processing information;

(b) a data transfer means for interconnecting the plurality of processors so that data can be transferred between the plurality of processors, the data transfer means including a plurality of cluster buses, each cluster bus including at least one sub-cluster bus, each sub-cluster bus being coupled to at least two of the plurality processors;

(c) a selector means, coupling the plurality of processors and the sub-cluster buses, for selectively connecting each processor to one of the sub-cluster buses to which it is coupled, wherein each group of processors connected to one of the sub-cluster buses forms a cluster.

2. A parallel computer as recited in claim 1 further comprising a system bus connected to each processor means.

3. A parallel computer as recited in claim 2 wherein said processor means comprises:

(a) a processor connected to said system bus; and (b) a memory connected to said processor and said selector means.

4. A parallel computer as recited in claim 3 wherein said memory is a distributed shared memory.

5. A parallel computer as recited in claim 1 wherein said data transfer means further includes a local area network.

6. A switching system between a plurality of processors of a parallel computer, comprising:

(a) the plurality of processors;

(b) a plurality of local memories, each local memory being respectively connected to one of the plurality of processors;

(c) data transfer passes connected to the plurality of local memories for transferring data between said plurality of processors; and (d) a dedicated transfer data processor, connected to the data transfer passes, for controlling the data transfer between the plurality of processors;

wherein each of the plurality of local memories includes a first memory for storing transferred data and a second memory for storing data to be transferred; and the dedicated data transfer processor accesses selected local memories at an arbitrary timing, and re-accesses said selected local memories again only upon receipt of an interrupt signal output by a comparison circuit indicating that the data to be transferred was not yet stored in said selected local memories during a previous access.

7. A parallel computer according to claim 6, wherein (a) the plurality of local memories include a memory for storing the transferred data and a memory for storing data to be transferred; and (b) the dedicated data transfer processor accesses selected local memories at an arbitrary timing, and re-accesses said selected local memories again in response to an interrupt signal output by the selected local memory indicating that the data to be transferred is not yet stored in said selected local memories.

8. A cluster in a parallel processing computer, which can be reconstructed during operation of the parallel processing computer comprising:

(a) a plurality of processor means for processing information, each processor means running an operating program and each processor means capable of accessing a respective one of a plurality of local memories coupled to the processor means, wherein each of the local memories includes a first memory for storing transferred data and a second memory for storing data to be transferred, at an arbitrary timing according to the operating program;

(b) a data transfer means connected to said plurality of processor means for transmitting information between said plurality of processor means; and (c) a dedicated transfer processor means connected to said data transfer means for controlling the transmission of information between said plurality of processor means;

(d) a plurality of comparison circuits, coupled to respective second memories, wherein each comparison circuit compares contents of a writing address counter with contents of a reading address counter and issues an interrupt signal to the transfer processor means when the contents of the reading address counter is larger that the contents of the writing address counter indicating that data has not yet been properly transferred.

9. A cluster as recited in claim 8 further comprising a system bus where said system bus connects each of said processor means.

10. A cluster as recited in claim 8 wherein said first memory is a distributed shared memory.

11. A cluster as recited in claim 8 wherein said data transfer means is a bus.

12. A cluster as recited in claim 8 wherein said data transfer means is a local area network.

13. A cluster as recited in claim 8 wherein said transfer processor means comprises:

(a) a transfer program memory; and (b) a transfer processor connected to said transfer program memory.

14. A method of controlling transmission of information between respective buffer memories coupled to a plurality of processor means, comprising the steps of:

(a) programming a dedicated transfer processor means, coupled to a data transfer means connected between the plurality of processor means, with a schedule for the transmission of the information;

(b) processing the schedule in the processor means;

(c) writing the information into the respective buffer memory of a processor from which data is to be transferred according to the schedule;

(d) reading the respective buffer memory according to the schedule in order to transfer the information to another processor; and (e) reading the respective buffer memory continuously in response to an interrupt signal provided by a comparator indicating that the buffer memory is empty until the interrupt signal is cleared.

* * * * *